(12) United States Patent
Nakamura et al.

(10) Patent No.: US 10,197,681 B2
(45) Date of Patent: Feb. 5, 2019

(54) STATE CALCULATING DEVICE, METHOD OF CALCULATING STATE, AND STATE CALCULATING PROGRAM

(71) Applicant: Furuno Electric Co., Ltd., Nishinomiya (JP)

(72) Inventors: Hiraku Nakamura, Osaka (JP); Naomi Fujisawa, Nishinomiya (JP); Hiroyuki Toda, Nishinomiya (JP); Takeshi Nagano, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 15/540,022

(22) PCT Filed: Nov. 26, 2015

(86) PCT No.: PCT/JP2015/083154
§ 371 (c)(1),
(2) Date: Jun. 26, 2017

(87) PCT Pub. No.: WO2016/104033
PCT Pub. Date: Jun. 30, 2016

(65) Prior Publication Data
US 2017/0350988 A1 Dec. 7, 2017

(30) Foreign Application Priority Data

Dec. 26, 2014 (JP) .................................. 2014-264587

(51) Int. Cl.
*G01S 19/55* (2010.01)
*G01S 13/84* (2006.01)
(Continued)

(52) U.S. Cl.
CPC ............ *G01S 19/55* (2013.01); *G01C 21/165* (2013.01); *G01S 13/84* (2013.01); *G01S 19/54* (2013.01);
(Continued)

(58) Field of Classification Search
CPC ........ G01S 19/55; G01S 13/84; G01S 5/0284; G01S 19/49; G01C 21/165
See application file for complete search history.

(56) References Cited

U.S. PATENT DOCUMENTS 5,021,792 A * 6/1991 Hwang ................... G01S 19/55
342/357.31
5,657,025 A * 8/1997 Ebner .................. G01C 21/165
342/442
(Continued)

FOREIGN PATENT DOCUMENTS

JP 200240124 A 2/2002
JP 200254946 A 2/2002
(Continued)

OTHER PUBLICATIONS

Hirokawa R. et al., "A Low Cost GPS/INS Sensor for Small UAVs Augmented with Multiple GPS Antennas", In Proceedings of ION GNSS 20th International Technical Meeting of the Satellite Division, Sep. 25, 2007, Fort Worth, Texas, 8 pages.
(Continued)

*Primary Examiner* — Frederick M Brushaber
(74) *Attorney, Agent, or Firm* — Alleman Hall Creasman & Tuttle LLP

(57) ABSTRACT

A small-sized state calculating device which may acquire a highly-precise state calculation value is provided. The state calculating device may include antennas, receiving parts, a phase difference calculating part and an operation part. The receiving parts may calculate carrier phase measurements
(Continued)

$PY_A$, $PY_B$ and $PY_C$ of GNSS signals received by the antennas, respectively. The phase difference calculating part may set the antennas to be switched between a master antenna and a slave antenna, and calculate the plurality of inter-antenna phase differences $\Delta\zeta_{AB}$, $\Delta\zeta_{BC}$ and $\Delta\zeta_{CA}$, for every combination of the master antenna and the slave antenna, using the carrier phase measurements $PY_A$, $PY_B$ and $PY_C$. The operation part may calculate an attitude angle AT using the plurality of inter-antenna phase differences $\Delta\zeta_{AB}$, $\Delta\zeta_{BC}$ and $\Delta\zeta_{CA}$.

20 Claims, 11 Drawing Sheets

(51) Int. Cl.
  *G01C 21/16* (2006.01)
  *G01S 19/54* (2010.01)
  *G01S 19/47* (2010.01)
  *G01S 19/49* (2010.01)
  *G01S 5/02* (2010.01)

(52) U.S. Cl.
  CPC .......... *G01S 5/0284* (2013.01); *G01S 19/47* (2013.01); *G01S 19/49* (2013.01)

(56) References Cited

U.S. PATENT DOCUMENTS

| | | | | |
|---|---|---|---|---|
| 6,052,647 | A * | 4/2000 | Parkinson | G01S 19/11 |
| | | | | 342/357.36 |
| 2002/0029110 | A1 | 3/2002 | Fukuda et al. | |
| 2002/0050943 | A1 | 5/2002 | Toda et al. | |
| 2003/0154049 | A1* | 8/2003 | Toda | G01S 19/55 |
| | | | | 702/151 |
| 2007/0075896 | A1* | 4/2007 | Whitehead | G01S 19/53 |
| | | | | 342/357.36 |
| 2008/0269988 | A1* | 10/2008 | Feller | A01B 69/007 |
| | | | | 701/41 |
| 2009/0164067 | A1* | 6/2009 | Whitehead | A01B 79/005 |
| | | | | 701/41 |
| 2010/0312428 | A1* | 12/2010 | Roberge | A01B 69/007 |
| | | | | 701/23 |
| 2011/0054729 | A1* | 3/2011 | Whitehead | A01B 69/007 |
| | | | | 701/31.4 |
| 2011/0068975 | A1* | 3/2011 | Zietz | G01S 19/35 |
| | | | | 342/357.36 |
| 2012/0174445 | A1* | 7/2012 | Jones | A01B 69/007 |
| | | | | 37/197 |
| 2013/0315287 | A1* | 11/2013 | Cornic | G01S 3/40 |
| | | | | 375/224 |
| 2014/0324291 | A1* | 10/2014 | Jones | E02F 9/2045 |
| | | | | 701/41 |
| 2017/0357010 | A1* | 12/2017 | Vella-Coleiro | G01S 19/55 |
| 2018/0113473 | A1* | 4/2018 | Webber | E02F 9/2045 |

FOREIGN PATENT DOCUMENTS

| | | |
|---|---|---|
| JP | 2003232845 A | 8/2003 |
| JP | 2006126181 A | 5/2006 |
| JP | 2006153816 A | 6/2006 |
| WO | 2011044666 A1 | 4/2011 |

OTHER PUBLICATIONS

Falco G. et al., "Low-cost Real-time Tightly-Coupled GNSS/INS Navigation System Based on Carrier-phase Double-differences UAV Applications", In Proceedings of the 27th International Technical Meeting of The Satellite Division of the Institute of Navigation, Sep. 8, 2014, Tampa, Florida, 17 pages.

ISA Japan Patent Office, International Search Report Issued in Application No. PCT/JP2015/083154, dated Feb. 23, 2016, WIPO, 4 pages.

European Patent Office, Supplementary European Search Report Issued in Application No. 15872602.6, dated Sep. 7, 2018, Germany, 10 pages.

* cited by examiner

STATE CALCULATING DEVICE, METHOD OF CALCULATING STATE, AND STATE CALCULATING PROGRAM

CROSS REFERENCE TO RELATED APPLICATIONS

This application is a U.S. National stage of International Application No. PCT/JP2015/083154 filed on Nov. 26, 2015, which in turn claims priority to Japanese Patent Application No. 2014-264587 filed on Dec. 26, 2014, the entire disclosure of each of which is hereby incorporated herein by reference for all purposes.

TECHNICAL FIELD

The present disclosure relates to a state calculating device which may calculate a traveling state, such as an attitude angle, speed, and a position of a movable body, such as a ship, a flight object, and an automobile. The present disclosure also relates to a method of calculating the state, and a state calculating program.

BACKGROUND ART

Nonpatent Document 1 discloses a configuration which includes a plurality of GPS (Global Positioning System) antennas, a plurality of GPS receivers respectively connected with the plurality of GPS antennas, an IMU sensor, and an integrated processing part.

The plurality of GPS antennas receive GPS signals which are transmitted from GPS satellites, and output them to the GPS receivers. The plurality of GPS antennas is comprised of a master GPS antenna and a plurality of slave GPS antennas. The master GPS antenna and the plurality of slave GPS antennas are mounted to a movable body so that distances between the master GPS antenna and the slave GPS antennas are lengthened as long as possible. This is because it is known that a state calculation value of the movable body can be detected with greater accuracy as the distances between the GPS antennas (base lengths) is longer. Here, the state calculation value of the movable body is an attitude angle of the movable body, for example.

The GPS receiver calculates and outputs a pseudo range, a Δ range, and a carrier phase of the received GPS signal. The IMU sensor includes an angular-velocity sensor and an acceleration sensor to measure and output an angular velocity and an acceleration of the movable body. The integrated processing part calculates a speed, an acceleration, and an attitude angle of the movable body based on the angular velocity and the acceleration from the IMU sensor. Here, the integrated processing part corrects errors of the calculated position, speed, and attitude angle using the pseudo ranges, the Δ ranges, and the carrier phases acquired from the plurality of GPS receivers.

Moreover, Nonpatent Document 2 discloses calculating double phase differences using four GNSS antennas, and calculating a position, a speed, and an attitude angle using the double phase differences. With this configuration, one GNSS antenna is set as a reference antenna among the four GNSS antennas to set a base line vector.

REFERENCE DOCUMENTS OF CONVENTIONAL ART

Nonpatent Documents

NONPATENT DOCUMENT 1: A Low Cost GPS/INS Sensor for Small UAVs Augmented with Multiple GPS antennas; Rui Hirokawa, Ryusuke Ohata, Takuji Ebinuma and Taro Suzuki; ION GNSS 20th International Technical Meeting of the Satellite Division, 25-28, Sep. 2007, Fort Worth, Tex.

NONPATENT DOCUMENT 2: Low-cost Real-time Tightly-Coupled GNSS/INS Navigation System Based on Carrier-phase Double-differences for UAV Applications; Lopez Casariego, E., E. Perez, G. Falco, M. Campo-Cossio Gutierrez, F. Zacchello, and S. Bories; ION GNSS+, September 2014

DESCRIPTION OF THE DISCLOSURE

Problems to be Solved by the Disclosure

However, when the configuration disclosed in Nonpatent Document 1 is used, since it is necessary to lengthen the distances between the GPS antennas, the entire size of the state calculating device increases. Thus, for example, when the installation position of the GPS antennas is limited, a problem that the GPS antennas cannot be installed or the state calculation value cannot be acquired with high precision arises.

Moreover, in the configuration disclosed in Nonpatent Document 2, since one antenna among the plurality of GNSS antennas which are arranged is set as the reference antenna, the number of base lines which can be formed is limited by the number of GNSS antennas. Thus, if the number of base lines is increased in order to improve the accuracy, the number of antennas must be increased at least by the number of base lines, thereby downsizing is inhibited.

Therefore, the purpose of the present disclosure is to provide a small-sized state calculating device which may acquire a highly-precise state calculation value.

SUMMARY OF THE DISCLOSURE

According to one aspect of this disclosure, a state calculating device is provided, which may include first, second and third GNSS antennas configured to receive GNSS signals, respectively, first, second and third receiving parts, a phase difference calculating part and an operation part. The first GNSS receiving part may calculate a carrier phase of the GNSS signal received by the first GNSS antenna. The second GNSS receiving part may calculate a carrier phase of the GNSS signal received by the second GNSS antenna. The third GNSS receiving part may calculate a carrier phase of the GNSS signal received by the third GNSS antenna. The phase difference calculating part may select two of the first GNSS antenna, the second GNSS antenna, and the third GNSS antenna, determine three or more combinations of a master antenna and a slave antenna, and calculate an inter-antenna phase difference, for every combination, using the carrier phases of the GNSS antennas used for the combination. The operation part may calculate an attitude angle using the inter-antenna phase differences calculated for every combination, where at least one master antenna for the combination of a master antenna and a slave antenna differs from the master antenna for the other combination.

With this configuration, the number of the inter-antenna phase differences utilized for estimation calculation of the attitude angle may be increased, which results in improving an accuracy of the estimation of the attitude angle.

In addition, the operation part may include an error calculating part and an integrated processing part. The error calculating part may estimate a calculation error of the attitude angle using geometric distance differences obtained from the inter-antenna phase differences and a geometric distance difference based on an attitude angle of the past calculated by the integrated processing part. The integrated processing part may calculate the attitude angle using an angular velocity or an acceleration measured by an inertia sensor, and the calculation error of the attitude angle.

With this configuration, the attitude angle may stably be outputted by using the measurement of the inertia sensor. Further, since the calculation error may be estimated by the angle attitude calculated with high precision using the GNSS signals, higher accurate angle attitude may be outputted.

In addition, the operation part may include an error calculating part and an integrated processing part. The error estimating part may estimate a calculation error of the attitude angle using the geometric distance differences and a geometric distance difference based on an attitude angle of the past calculated by the integrated processing part. Here, the error estimating part may estimate, in addition to the calculation error of the attitude angle, calculation errors of speeds and positions. The integrated processing part may calculate an attitude angle, a position and a speed using the angular velocity and the acceleration measured by the inertia sensor, and the calculation errors of the attitude angle, the calculation errors of the positions and the calculation errors of the speeds. The state calculating device may further include a position calculating part and a speed calculating part. The position calculating part may calculate a position of a specific point using the position of the first GNSS antenna calculated by the first GNSS receiving part, the position of the second GNSS antenna calculated by the second GNSS receiving part, and the position of the third GNSS antenna calculated by the third GNSS receiving part. The speed calculating part may calculate a speed of the specific point using the speed of the first GNSS antenna calculated by the first GNSS receiving part, the speed of the second GNSS antenna calculated by the second GNSS receiving part, and the speed of the third GNSS antenna calculated by the third GNSS receiving part. The error estimating part may estimate the calculation errors of the positions using the position of the specific point and the position of the past of the specific point calculated by the integrated processing part, or the calculation errors of the speeds using the speed of the specific point and the speed of the past of the specific point calculated by the integrated processing part.

With this configuration, by using for the error estimating processing the position of the specific point and the speed of the specific point calculated by the separate processing from the error estimating processing, a processing load of the error estimating processing may be reduced.

In the state calculating device according to this aspect, the attitude angle may be a yaw angle. With this configuration, the direction to which a movable body oriented may be calculated with high precision.

Effect of the Disclosure

According to the present disclosure, the state calculation value, such as the attitude angle, may be acquired with high precision, without being influenced by the arrangement environment etc. of the device.

MODES FOR CARRYING OUT THE DISCLOSURE

A state calculating device, a method of calculating a state, and a state calculating program according to a first embodiment of the present disclosure are described with reference to the accompanying drawings. Although in this embodiment a device which may calculate a traveling state of a surface ship as a movable body is described, the following configuration may also be applied to cases where a moving state of other movable bodies, such as a marine surface movable body, a submarine movable body, a land movable body such as an automobile, and an air movable body such as an airplane, is calculated.

Figure 1:
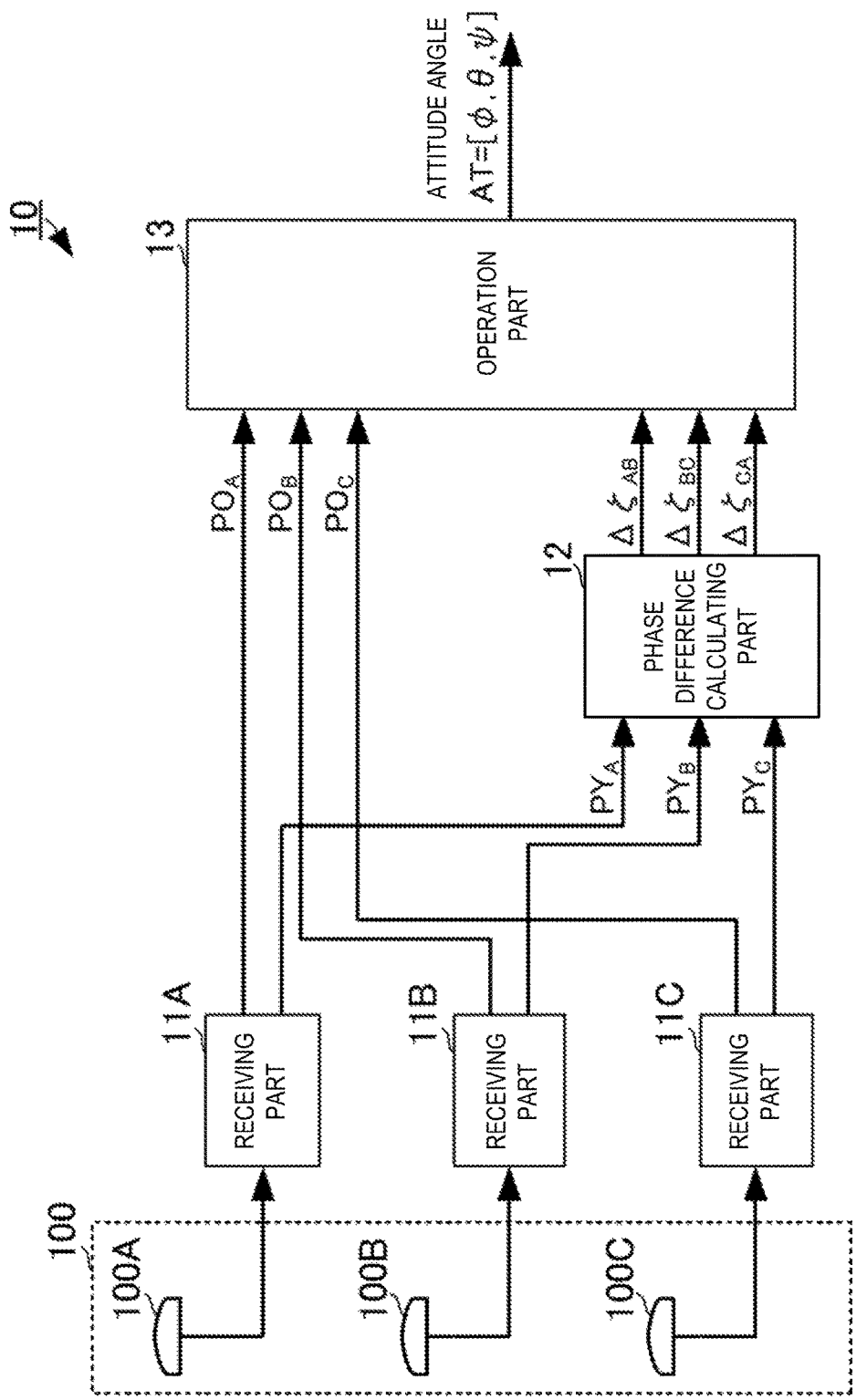
FIG. 1 is a block diagram illustrating a configuration of a state calculating device according to a first embodiment of the present disclosure.
Figure 2:
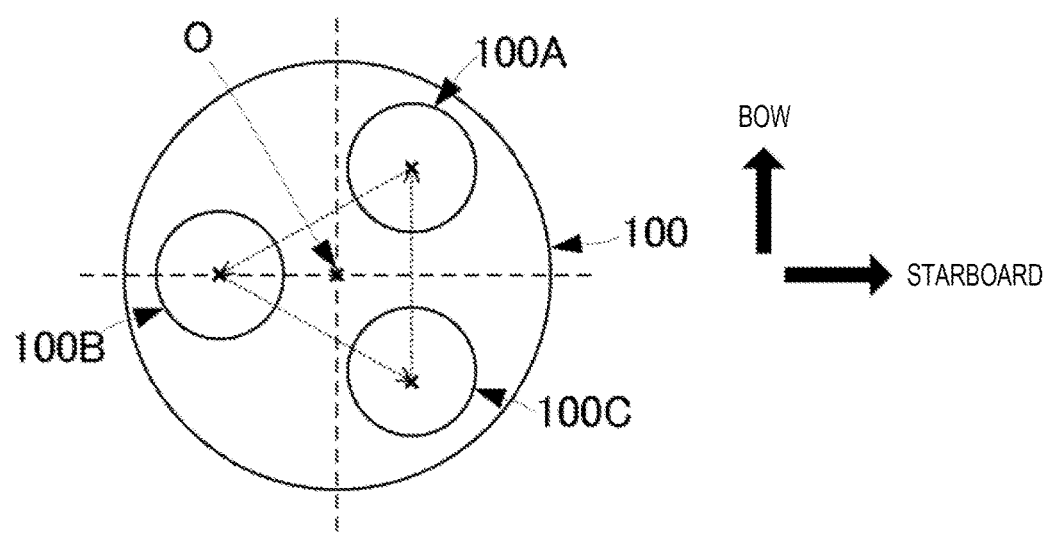
FIG. 2 is a view illustrating a spatial relationship of antennas used for the state calculating device according to the first embodiment of the present disclosure.

FIG. 1 is a block diagram illustrating a configuration of the state calculating device according to the first embodiment of the present disclosure. FIG. 2 is a view illustrating a spatial relationship of antennas used for the state calculating device according to the first embodiment of the present disclosure.

As illustrated in FIG. 1, a state calculating device 10 may include an antenna part 100, receiving parts 11A, 11B and 11C, a phase difference calculating part 12, and an operation part 13.

The antenna part 100 may include a first antenna 100A, a second antenna 100B, and a third antenna 100C. The antenna part 100 may be disposed at a location of the ship body where sky is visible without obstructions. The first antenna 100A may correspond to a first GNSS antenna, the second antenna 100B may correspond to a second GNSS antenna, and the third antenna 100C may correspond to a third GNSS antenna.

As illustrated in FIG. 2, an arrangement pattern of the first antenna 100A, the second antenna 100B, and the third antenna 100C may spread two-dimensionally. As one example of a particular arrangement state, as illustrated in FIG. 2, the first antenna 100A and the third antenna 100C may be disposed so that a base line connecting these antennas becomes parallel to directions connecting a bow and a stern (bow-stern directions). The second antenna 100B may be disposed at a different position from the base line connecting the first antenna 100A and the third antenna 100C, and a straight line which is an extension of this base line. In the example of FIG. 2, the second antenna 100B may be disposed between the first antenna 100A and the third antenna 100C in the bow-stern directions. The second antenna 100B may be disposed in a direction perpendicular to the base line connecting the first antenna 100A and the third antenna 100C so as to be spaced apart from the base line. In the example of FIG. 2, the second antenna 100B may be disposed at a position which is equally distant from the first antenna 100A and the third antenna 100C.

The distance between the first antenna 100A and the second antenna 100B, the distance between the second antenna 100B and the third antenna 100C, and the distance between the third antenna 100C and the first antenna 100A may be short. Thus, a degree of freedom of arrangement of the antenna part 100 may be improved. Moreover, a determination of an integral value bias may be made easier. Furthermore, the distance between these antennas may desirably be below a length of a wavelength $\lambda$ of a GPS signal, and more desirably be about $\lambda/2$. By setting the distance between the antennas to about $\lambda/2$, the determination of the integral value bias may be made further easier.

Note that, this arrangement may be one example, and three or more antennas may be arranged so as to spread two-dimensionally.

The first, second, and third antennas 100A, 100B and 100C may receive and output GPS signals transmitted from GPS (Global Positioning System) satellites. Note that, although in this embodiment GPS may be illustrated as one example, the configuration of this embodiment may also be applied to other systems of GNSS (Global Navigation Satellite System).

The receiving part 11A may correspond to a first GNSS receiving part, and may be connected to the first antenna 100A. The receiving part 11A may acquire and track the GPS signal, and calculate a pseudo range for every GPS signal (every GPS satellite). The receiving part 11A may calculate a position $PO_A$ of the first antenna 100A using an independent positioning method based on the pseudo range. The receiving part 11A may output the position $PO_A$ of the first antenna 100A to the operation part 13. The receiving part 11A may calculate a carrier phase measurement $PY_A$ for every GPS signal (every GPS satellite). The receiving part 11A may output the carrier phase measurement $PY_A$ to the phase difference calculating part 12.

The receiving part 11B may correspond to a second GNSS receiving part, and may be connected to the second antenna 100B. The receiving part 11B may acquire and track the GPS signal, and may calculate a pseudo range for every GPS signal (every GPS satellite). The receiving part 11B may calculate a position $PO_B$ of the second antenna 100B using an independent positioning method based on the pseudo range. The receiving part 11B may output the position $PO_B$ of the second antenna 100B to the operation part 13. The receiving part 11B may calculate a carrier phase measurement $PY_B$ for every GPS signal (every GPS satellite). The receiving part 11B may output the carrier phase measurement $PY_B$ to the phase difference calculating part 12.

The receiving part 11C may correspond to a third GNSS receiving part, and may be connected to the third antenna 100C. The receiving part 11C may acquire and track the GPS signal, and may calculate a pseudo range for every GPS signal (every GPS satellite). The receiving part 11C may calculate a position $PO_C$ of the third antenna 100C using an independent positioning method based on the pseudo range. The receiving part 11C may output the position $PO_C$ of the third antenna 100C to the operation part 13. The receiving part 11C may calculate a carrier phase measurement $PY_C$ for every GPS signal (every GPS satellite). The receiving part 11C may output the carrier phase measurement $PY_C$ to the phase difference calculating part 12.

The receiving parts 11A, 11B and 11C may be synchronized with each other. For example, a common clock signal may be inputted into the receiving parts 11A, 11B and 11C, and the receiving parts 11A, 11B and 11C may perform the acquisition and tracking of the GPS signal synchronizing with this clock signal.

The phase difference calculating part 12 may calculate an inter-antenna phase difference for every combination of two set of antennas among the first, second, and third antennas 100A, 100B and 100C. Here, the phase difference calculating part 12 may calculate the inter-antenna phase difference of the combination, while setting one antenna to either a master antenna or a slave antenna. Note that the combination may be determined by a permutation (P), or a combination (C). Specifically, the phase difference calculating part 12 may execute the following processing.

As a first combination, the phase difference calculating part 12 may set the first antenna 100A as a master antenna, and may set the second antenna 100B as a slave antenna. The phase difference calculating part 12 may calculate an inter-antenna phase difference $\Delta\zeta_{AB}$ ($=PY_B-PY_A$) by calculating a difference value between the carrier phase measurement $PY_A$ and the carrier phase measurement $PY_B$.

As a second combination, the phase difference calculating part 12 may set the second antenna 100B as a master antenna, and may set the third antenna 100C as a slave antenna. The phase difference calculating part 12 may calculate an inter-antenna phase difference $\Delta\zeta_{BC}$ ($=PY_C-PY_B$) by calculating a difference value between the carrier phase measurement $PY_B$ and the carrier phase measurement $PY_C$.

As a third combination, the phase difference calculating part 12 may set the third antenna 100C as a master antenna, and may set the first antenna 100A as a slave antenna. The phase difference calculating part 12 may calculate an inter-antenna phase difference $\Delta\zeta_{CA}$ ($=PY_A-PY_C$) by calculating a difference value between the carrier phase measurement $PY_C$ and the carrier phase measurement $PY_A$.

By performing such processing, a greater number of inter-antenna phase differences may be calculated within a preset number of antennas than a conventional case where the master antenna is fixed. On the contrary, the number of antennas may be reduced in order to acquire a prelimited number of inter-antenna phase differences.

The phase difference calculating part 12 may output the inter-antenna phase differences $\Delta\zeta_{AB}$, $\Delta\zeta_{BC}$ and $\Delta\zeta_{CA}$ to the operation part 13.

The operation part 13 may analyze a navigation message superimposed on the GPS signal, and acquire a satellite position. The operation part 13 may acquire at least the positions of the GPS satellites which are senders of the GPS signals received by the receiving parts 11A, 11B and 11C.

The operation part 13 may calculate a direction cosine for every inter-antenna phase difference $\Delta\zeta_{AB}$, $\Delta\zeta_{BC}$ and $\Delta\zeta_{CA}$ using the satellite position, and the first, second and third antenna positions $PO_A$, $PO_B$ and $PO_C$. Specifically, the operation part 13 may calculate the direction cosine corresponding to the inter-antenna phase difference $\Delta\zeta_{AB}$ by using the first and second antenna positions $PO_A$ and $PO_B$, and the satellite position of the GPS satellite which is a sender of the GPS signal received by both the first antenna 100A and the second antenna 100B. The operation part 13 may calculate the direction cosine corresponding to the inter-antenna phase difference $\Delta\zeta_{BC}$ by using the second and third antenna positions $PO_B$ and $PO_C$, and the satellite position of the GPS satellite which is a sender of the GPS signal received by both the second antenna 100B and the third antenna 100C. The operation part 13 may calculate the direction cosine corresponding to the inter-antenna phase difference $\Delta\zeta_{CA}$ by using the third and first antenna positions $PO_C$ and $PO_A$, and the satellite position of the GPS satellite which is a sender of the GPS signal received by both the third antenna 100C and the first antenna 100A. The operation part 13 may set a direction cosine matrix by using each direction cosine.

The operation part 13 may calculate an attitude angle AT using the inter-antenna phase differences $\Delta\zeta_{AB}$, $\Delta\zeta_{BC}$ and $\Delta\zeta_{CA}$, and the direction cosine matrix. The attitude angle AT may be comprised of a roll angle $\varphi$, a pitch angle $\theta$, and a yaw angle $\psi$. Note that, as the attitude angle AT, at least the yaw angle $\psi$ may be calculated.

More specifically, the operation part 13 may use a known method, such as a LAMDA method to estimate and determine an integral value bias for every inter-antenna phase difference $\Delta\zeta_{AB}$, $\Delta\zeta_{BC}$ and $\Delta\zeta_{CA}$. The operation part 13 may use the inter-antenna phase differences $\Delta\zeta_{AB}$, $\Delta\zeta_{BC}$ and $\Delta\zeta_{CA}$, and the integral value biases to calculate a geometric distance difference corresponding to each inter-antenna phase difference $\Delta\zeta_{AB}$, $\Delta\zeta_{BC}$ and $\Delta\zeta_{CA}$.

The operation part 13 may use the geometric distance differences and the direction cosine matrix to calculate the attitude angle AT by applying a least-squares method etc.

By using such a configuration and processing, the inter-antenna phase differences may be calculated even if the number of antennas is small and, thus, the attitude angle may be calculated with high precision. Since a greater number of inter-antenna phase differences may be calculated, the attitude angle may be calculated with high precision even if the distances between the first, second, and third antennas 100A, 100B and 100C are short. Moreover, since the calculation of the attitude angle may be continued even if the GPS signal is not able to be received by any one of the first, second, and third antennas 100A, 100B and 100C, robustness may be improved.

Furthermore, since the distances between the first, second, and third antennas 100A, 100B and 100C may be shortened, the antenna part 100 may be downsized. Thus, it may be difficult to be limited the installation space. Therefore, the space-saving state calculating device 10 which may calculate the attitude angle with high precision may be achieved.

Note that in FIG. 1 the mode where the phase difference calculating part 12 and the operation part 13 are separate functional parts is illustrated. However, the phase difference calculating part 12 and the operation part 13 may be formed by a single information processing device. Furthermore, the receiving parts 11A, 11B and 11C, the phase difference calculating part 12, and the operation part 13 may be formed by a single information processing device. In this case, the information processing device may store beforehand program(s) which implements the following method of calculating the state, and read and execute the program.

Figure 3:
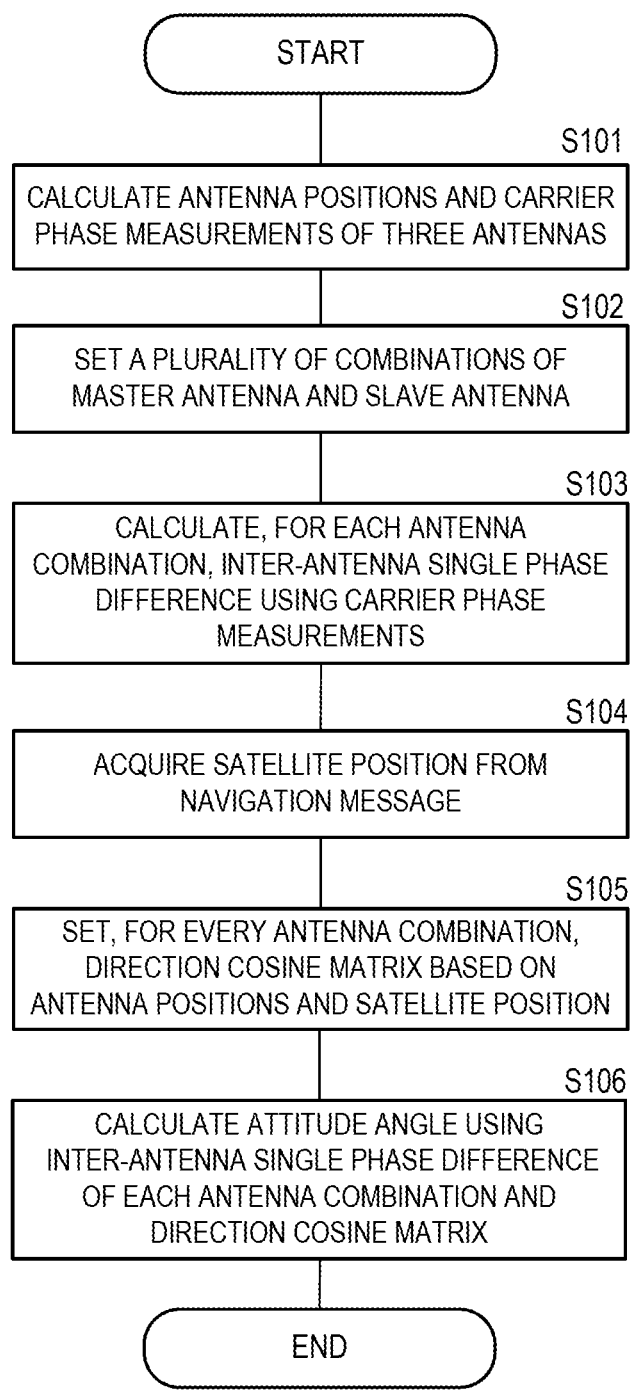
FIG. 3 is a flowchart of a method of calculating a state according to the first embodiment of the present disclosure.
Figure 4:
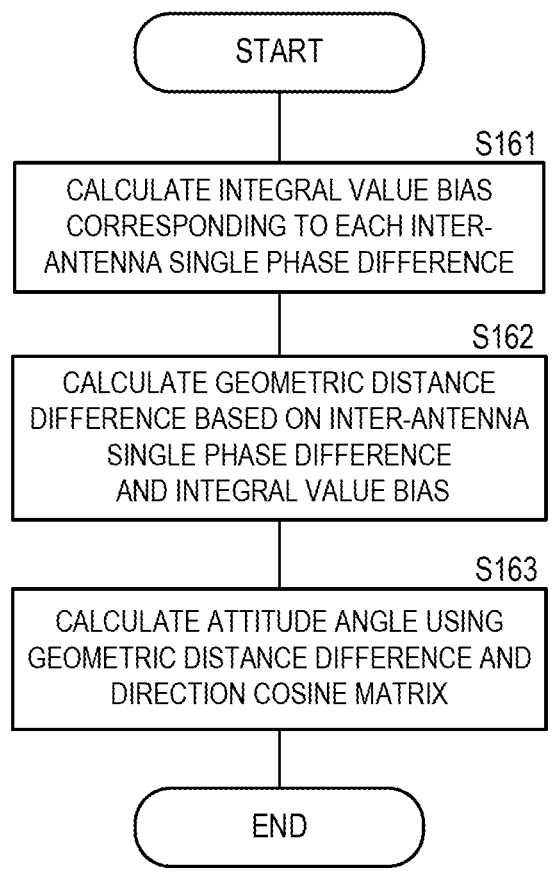
FIG. 4 is a flowchart illustrating particular processing of Step S106 of FIG. 3.

FIG. 3 is a flowchart of the method of calculating the state according to the first embodiment of the present disclosure. FIG. 4 is a flowchart illustrating particular processing of Step S106 of FIG. 3. FIGS. 3 and 4 illustrate a case where a single phase difference is used.

The information processing device may acquire and track the GPS signals received by the first, second, and third antennas 100A, 100B and 100C. The information processing device may calculate the positions $PO_A$, $PO_B$ and $PO_C$ and the carrier phase measurements $PY_A$, $PY_B$ and $PY_C$ of the first, second and third antennas 100A, 100B and 100C (S101).

The information processing device may combine the first, second, and third antennas 100A, 100B and 100C by setting the master antenna and the slave antenna, and set a plurality of combinations of antennas (S102). Here, the information processing device may set each antenna both as the slave antenna and as the master antenna. Thus, the combination where one antenna is set as the master antenna, and the combination where the antenna is set as the slave antenna may be achieved.

The information processing device may calculate, for each combination of antennas, the inter-antenna phase differences $\Delta\zeta_{AB}$, $\Delta\zeta_{BC}$ and $\Delta\zeta_{CA}$ which are inter-antenna single phase differences using the carrier phase measurements $PY_A$, $PY_B$ and $PY_C$ (S103). The inter-antenna single phase difference may be a phase difference of the GPS signals received by the respective antennas when two antennas receive a GPS signal from a common GPS satellite.

The information processing device may analyze the navigation message which is superimposed on the tracking GPS signal, and acquire a satellite position (S104).

The information processing device may calculate, for every combination of the antennas, the direction cosines based on the positions $PO_A$, $PO_B$ and $PO_C$ of the first, second, and third antennas 100A, 100B and 100C, and the satellite position, and set the direction cosine matrix (S105).

The information processing device may calculate the attitude angle AT by applying the least-squares method etc. using the inter-antenna phase differences $\Delta\zeta_{AB}$, $\Delta\zeta_{BC}$ and $\Delta\zeta_{CA}$, and the direction cosine matrix (S106).

More specifically, as illustrated in FIG. 4, the information processing device may calculate the integral value biases corresponding to the inter-antenna phase differences $\Delta\zeta_{AB}$, $\Delta\zeta_{BC}$ and $\Delta\zeta_{CA}$, respectively (S161). Here, as described above, the integral value biases may certainly be calculated by high speed by shortening the distances between the first, second and third antennas 100A, 100B and 100C. Especially, the integral value biases may correctly be calculated by a higher speed by setting the distances between the first, second and third antennas 100A, 100B and 100C to about ½ of the wavelength of the GPS signals.

The information processing device may calculate geometric distance differences based on the inter-antenna phase differences $\Delta\zeta_{AB}$, $\Delta\zeta_{BC}$ and $\Delta\zeta_{CA}$, and the integral value biases (S162). The geometric distance difference may be a difference between a geometric distance of one of the two antennas which receive the common GPS signal and the GPS satellite, and a geometric distance of the other antenna and the GPS satellite.

The information processing device may calculate the attitude angle by applying the least-squares method etc. using the geometric distance difference and the direction cosine matrix (S163).

Figure 5:
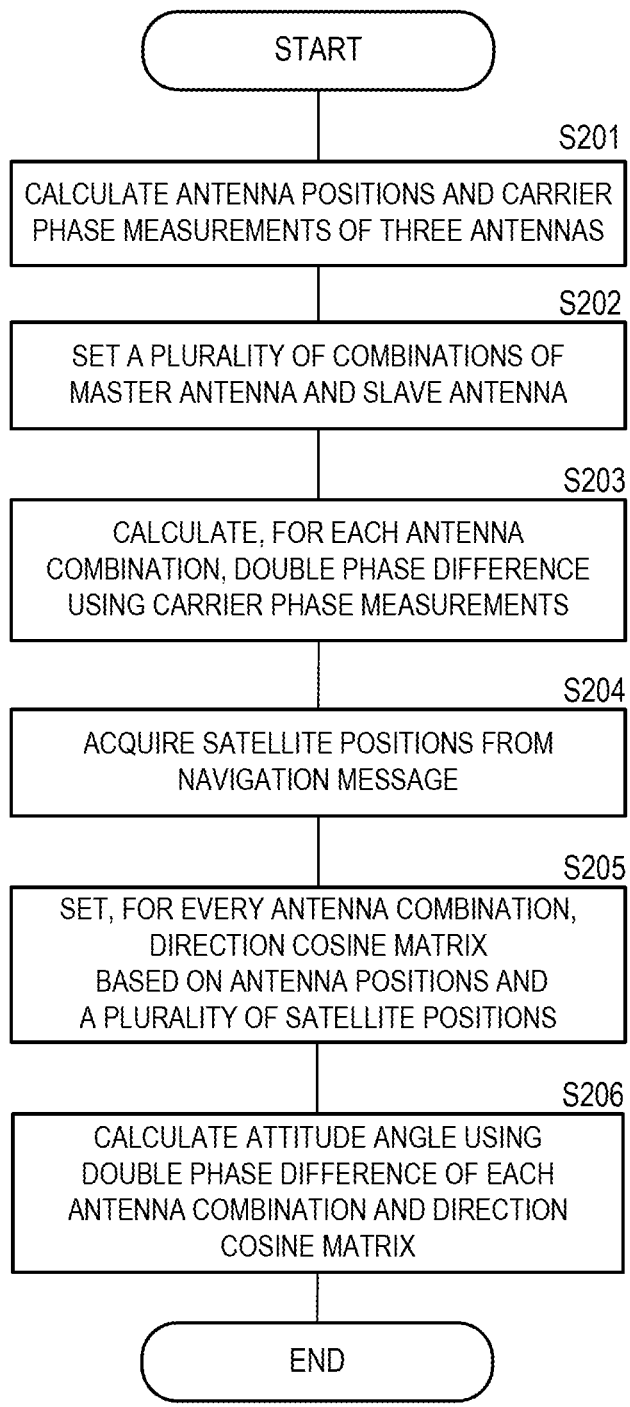
FIG. 5 is a flowchart of the method of calculating the state according to the first embodiment of the present disclosure.
Figure 6:
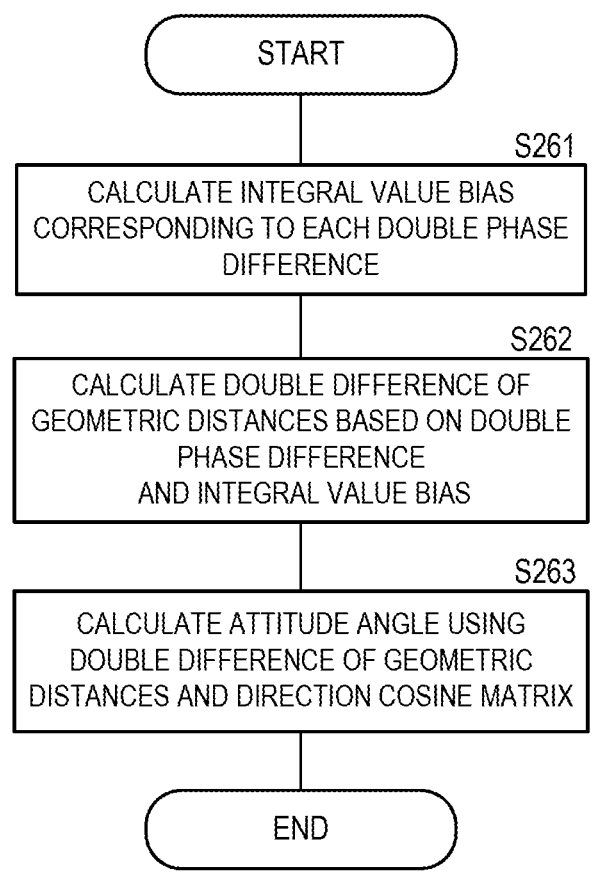
FIG. 6 is a flowchart illustrating particular processing of Step S206 of FIG. 5.

Note that in the processing described above, although the example where the inter-antenna single phase difference may be used is illustrated, a double phase difference may also be used. FIG. 5 is a flowchart of the method of calculating the state according to the first embodiment of the present disclosure. FIG. 6 is a flowchart illustrating particular processing of Step S206 of FIG. 5. FIGS. 5 and 6 illustrate a case where the double phase difference is used.

The information processing device may acquire and track the GPS signals received by the first, second, and third antennas 100A, 100B and 100C. The information processing device may calculate the positions $PO_A$, $PO_B$, $PO_C$ and the carrier phase measurements $PY_A$ and $PY_B$ and $PY_C$ of the first, second and third antennas 100A, 100B and 100C (S201).

The information processing device may combine the first, second and third antennas 100A, 100B and 100C by setting the master antenna and the slave antenna, and set the plurality of combinations of antennas (S202). Here, the information processing device may set each antenna both as the slave antenna and as the master antenna. Thus, the combination where one antenna is set as the master antenna, and the combination where the antenna is set as the slave antenna may be achieved.

The information processing device may calculate, for each combination of the antennas, the double phase difference using the carrier phase measurements $PY_A$, $PY_B$ and $PY_C$ (S203). The double phase difference may be a phase difference when two antennas receive the GPS signals from two common GPS satellites. Specifically, it is a difference between the phase difference of the two antennas with respect to one of the GPS satellites, and the phase difference of the two antennas with respect to the other GPS satellite.

The information processing device may analyze the navigation messages which is superimposed on the tracking GPS signal to acquire the satellite positions (S204).

The information processing device may calculate, for every combination of the antennas, the direction cosines based on the positions $PO_A$, $PO_B$ and $PO_C$ of the first, second, and third antennas 100A, 100B and 100C, and the satellite positions, and set the direction cosine matrix (S205).

The information processing device may set a Kalman filter using the double phase differences and the direction cosine matrix, and estimate the attitude angle AT (S206).

More specifically, as illustrated in FIG. 6, the information processing device may calculate the integral value bias corresponding to each of the double phase differences (S261). Here, as described above, the integral value biases may certainly be calculated by high speed by shortening the distances between the first, second, and third antennas 100A, 100B and 100C. Especially, the integral value biases may correctly be calculated by a higher speed by setting the distances between the first, second, and third antennas 100A, 100B and 100C to about ½ of the wavelength of the GPS signal.

The information processing device may calculate the double difference of the geometric distances (the difference of the geometric distance differences) based on the double phase differences and the integral value biases (S262).

The information processing device may calculate the attitude angle by applying the least-squares method etc. using the double difference of the geometric distance and the direction cosine matrix (S263).

Figure 7:
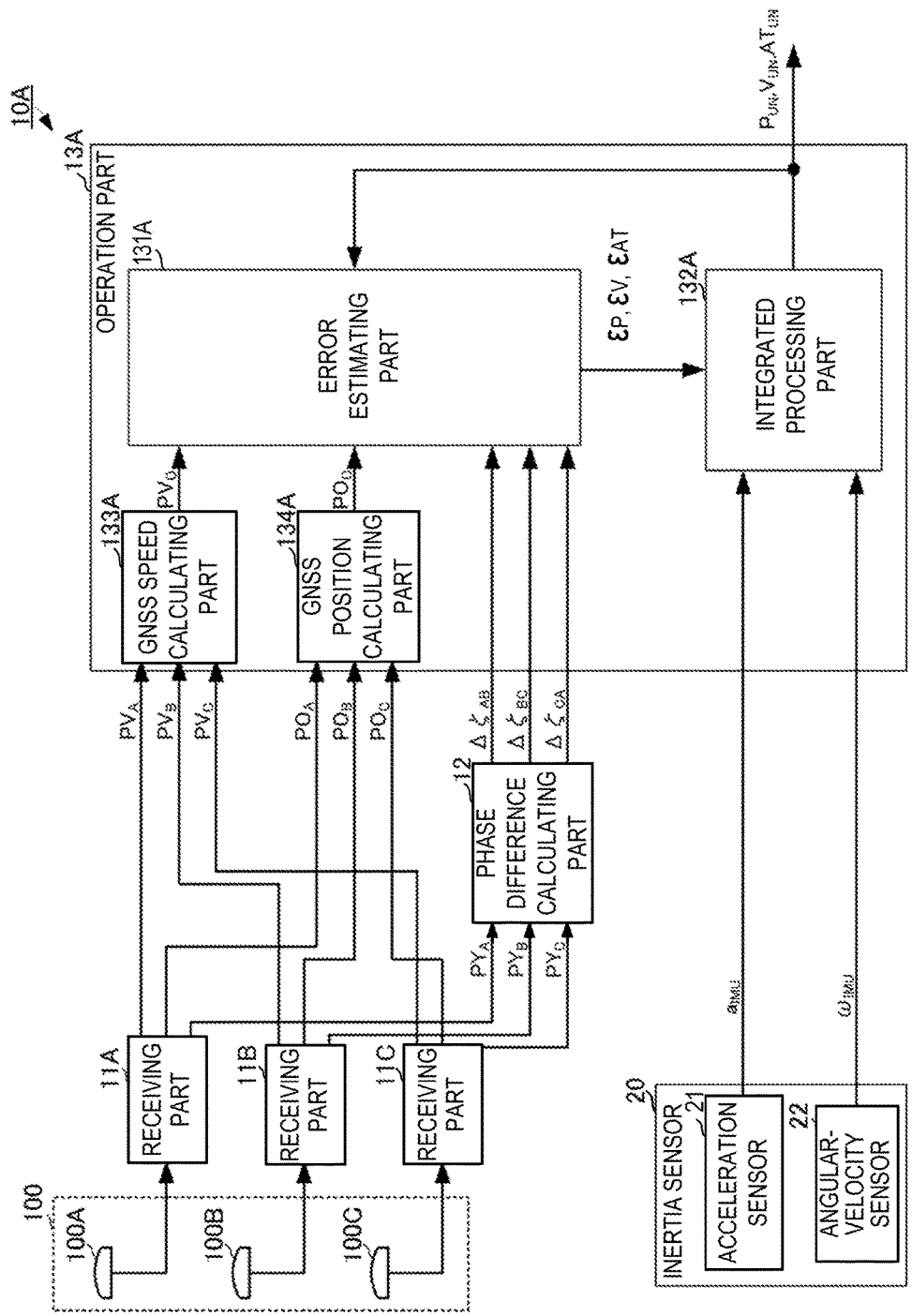
FIG. 7 is a block diagram of a state calculating device according to a second embodiment of the present disclosure.

Next, the state calculating device, the method of calculating a state, and a state calculating program according to the second embodiment are described with reference to the accompanying drawings. FIG. 7 is a block diagram of the state calculating device according to the second embodiment of the present disclosure.

Although the state calculating device 10 according to the first embodiment may be configured to estimate the attitude angle only based on the GPS signals, a state calculating device 10A according to this embodiment may further include an inertia sensor 20, and may calculate the attitude angle by using an angular velocity $\omega_{IMU}$ and an acceleration $a_{IMU}$ outputted from the inertia sensor 20. Furthermore, the state calculating device 10A according to this embodiment may calculate the attitude angle, the position, and the speed using an observation value based on the GPS signal, the angular velocity $\omega_{IMU}$, and the acceleration $a_{IMU}$.

The state calculating device 10A according to this embodiment may differ in the configuration of an operation part 13A from the state calculating device 10 according to the first embodiment, and the fundamental configurations of other parts are the same as those of the state calculating device 10 according to the first embodiment.

The state calculating device 10A may be connected to the inertia sensor 20. Note that the inertia sensor 20 may also be included in the state calculating device 10A. The inertia sensor 20 may include an acceleration sensor 21 and an angular-velocity sensor 22. The acceleration sensor 21 may measure the acceleration $a_{IMU}$ of the movable body. The angular-velocity sensor 22 may measure the angular velocity $\omega_{IMU}$ of the movable body.

The operation part 13A may include an error estimating part 131A, an integrated processing part 132A, a GNSS speed calculating part 133A, and a GNSS position calculating part 134A.

The receiving part 11A may calculate the position $PO_A$, a speed $PV_A$, and the carrier phase measurement $PY_A$ of the first antenna 100A. The receiving part 11A may output the position $PO_A$ of the first antenna 100A to the GNSS position calculating part 134A. The receiving part 11A may output the speed $PV_A$ of the first antenna 100A to the GNSS speed calculating part 133A. The receiving part 11A may output the carrier phase measurement $PY_A$ of the first antenna 100A to the phase difference calculating part 12.

The receiving part 11B may calculate the position $PO_B$, a speed $PV_B$, and the carrier phase measurement $PY_B$ of the second antenna 100B. The receiving part 11B may output the position $PO_B$ of the second antenna 100B to the GNSS position calculating part 134A. The receiving part 11B may output the speed $PV_B$ of the second antenna 100B to the GNSS speed calculating part 133A. The receiving part 11B may output the carrier phase measurement $PY_B$ of the second antenna 100B to the phase difference calculating part 12.

The receiving part 11C may calculate the position $PO_C$, a speed $PV_C$, and the carrier phase measurement $PY_C$ of the third antenna 100C. The receiving part 11C may output the position $PO_C$ of the third antenna 100C to the GNSS position calculating part 134A. The receiving part 11C may output speed $PV_C$ of the third antenna 100C to the GNSS speed calculating part 133A. The receiving part 11C may output the carrier phase measurement $PY_C$ of the third antenna 100C to the phase difference calculating part 12.

The phase difference calculating part 12 may output the inter-antenna phase differences $\Delta\zeta_{AB}$, $\Delta\zeta_{BC}$ and $\Delta\zeta_{CA}$ calculated using the carrier phase measurements $PY_A$, $PY_B$ and $PY_C$ to the error estimating part 131A.

The GNSS speed calculating part 133A may calculate a speed $PV_O$ at a specific position of the movable body to which the first, second and third antennas 100A, 100B and 100C are mounted, by using the speed $PV_A$, $PV_B$, and $PV_C$. As illustrated in FIG. 2, for example, the specific position may be a center position O of the first, second and third antennas 100A, 100B and 100C when the antenna part 100 is seen in the plan view. For example, the speed $PV_O$ of the specific position may be calculated by carrying out weighted average processing of the speeds $PV_A$, $PV_B$, and $PV_C$ of the first, second and third antennas 100A, 100B and 100C by using the distance between the specific position and the first, second and third antennas 100A, 100B and 100C. The GNSS speed calculating part 133A may output the speed $PV_O$ of the specific position to the error estimating part 131A.

The GNSS position calculating part 134A may calculate a position (coordinates) $PO_O$ of the specific position of the movable body to which the first, second, and third antennas 100A, 100B and 100C are mounted, by using the positions $PO_A$, $PO_B$ and $PO_C$. For example, the position $PO_O$ of the specific position may be calculated by carrying out the weighted average processing of the positions $PO_A$, $PO_B$ and $PO_C$ of the first, second, and third antennas 100A, 100B and 100C by using the distance between the specific position and the first, second, and third antennas 100A, 100B and 100C. The GNSS position calculating part 134A may output the position $PO_O$ of the specific position, and the positions $PO_A$, $PO_B$ and $PO_C$ of the first, second, and third antennas 100A, 100B and 100C to the error estimating part 131A.

The error estimating part 131A may estimate a calculation error $\varepsilon_P$ of the position, a calculation error $\varepsilon_V$ of the speed, and a calculation error $\varepsilon_{AT}$ of the attitude angle by using the position $PO_O$ of the specific position, the speed $PV_O$, and the inter-antenna phase differences $\Delta\zeta_{AB}$, $\Delta\zeta_{BC}$ and $\Delta\zeta_{CA}$, and previous integrated position $P_{UN}$, integrated speed $V_{UN}$, and integrated attitude angle $AT_{UN}$ which are calculated by the integrated processing part 132A.

Specifically, the error estimating part 131A may analyze the navigation message superimposed on the GPS signal, and acquire the satellite position.

The error estimating part 131A may calculate the direction cosine for every inter-antenna phase difference $\Delta\zeta_{AB}$, $\Delta\zeta_{BC}$ and $\Delta\zeta_{CA}$ using the satellite position, and the first, second and third antenna positions $PO_A$, $PO_B$ and $PO_C$. The error estimating part 131A may set a direction cosine matrix using each direction cosine.

The error estimating part 131A may calculate a difference $\Delta PO$ between the position $PO_O$ of the specific position and the integrated position $P_{UN}$ obtained from the previous calculation. The error estimating part 131A may calculate a difference $\Delta VO$ between the speed $PV_O$ of the specific position and the integrated speed $V_{UN}$ obtained from the previous calculation.

The error estimating part 131A may calculate an inter-antenna phase difference based on the integrated calculation result using the integrated attitude angle $AT_{UN}$ obtained from the previous calculation. The error estimating part 131A may calculate differences $\Delta\Delta\zeta_{AB}$, $\Delta\Delta\zeta_{BC}$ and $\Delta\Delta\zeta_{CA}$ of the inter-antenna phase differences by calculating differences between the inter-antenna phase differences $\Delta\zeta_{AB}$, $\Delta\zeta_{BC}$ and $\Delta\zeta_{CA}$ based on the GPS signal, and the inter-antenna phase differences based on the integrated calculation result.

The error estimating part 131A may set the difference $\Delta PO$ of the position, the difference $\Delta VO$ of the speed, and the differences $\Delta\Delta\zeta_{AB}$, $\Delta\Delta\zeta_{BC}$ and $\Delta\Delta\zeta_{CA}$ of the inter-antenna phase differences as observation values (observation vectors). The error estimating part 131A may set the calculation error $\varepsilon_P$ of the position, the calculation error $\varepsilon_V$ of the speed, and the calculation error $\varepsilon_{AT}$ of the attitude angle as estimated values (state vectors). The error estimating part 131A may set a Kalman filter using the observation values, the estimated values, and the direction cosine matrix. The error estimating part 131A may estimate the calculation error $\varepsilon_P$ of the position, the calculation error $\varepsilon_V$ of the speed, and the calculation error $\varepsilon_{AT}$ of the attitude angle using the Kalman filter.

The error estimating part 131A may output the calculation error $\varepsilon_P$ of the position, the calculation error $\varepsilon_V$ of the speed, and the calculation error $\varepsilon_{AT}$ of the attitude angle to the integrated processing part 132A.

The integrated processing part 132A may calculate the integrated position $P_{UN}$, the integrated speed $V_{UN}$, and the integrated attitude angle $AT_{UN}$ using the acceleration $a_{IMU}$ and the angular velocity $\omega_{IMU}$ outputted from the inertia sensor 20. Here, the integrated processing part 132A may perform a correction by the calculation error $\varepsilon_P$ of the position, the calculation error $\varepsilon_V$ of the speed, and the calculation error $\varepsilon_{AT}$ of the attitude angle.

By using such a configuration and processing, the position, speed, and attitude angle of the movable body may be calculated with high precision. Moreover, in this configuration, since the small-sized antenna part 100 may be used as described above, the space-saving state calculating device 10A which may calculate the position, speed, and attitude angle with high precision may be achieved. Moreover, the position, speed, and attitude angle may stably be calculated by using the measurement of the inertia sensor 20.

Note that, in the error estimating part 131A, a sensor error $\varepsilon_a$ of the acceleration sensor 21 and a sensor error $\varepsilon_\omega$ of the angular-velocity sensor 22 may also be estimated. In this case, the acceleration $a_{IMU}$ and the angular velocity $\omega_{IMU}$ may be added to the observation values of the error estimating part 131A.

The integrated processing part 132A may calculate the integrated position $P_{UN}$, the integrated speed $V_{UN}$, and the integrated attitude angle $AT_{UN}$ by using the sensor errors $\varepsilon_a$ and $\varepsilon_\omega$. Thus, the integrated position $P_{UN}$, the integrated speed $V_{UN}$, and the integrated attitude angle $AT_{UN}$ may be calculated with higher precision.

Moreover, the state calculating device 10A according to this embodiment may use the position $PO_O$ and the speed $PV_O$ calculated by the separate processing from the Kalman filter, as the observation values of the Kalman filter of the error estimating part 131A. Thus, as compared with a state calculating device 10B according to a third embodiment described later (a mode where the pseudo range, the amount of change in the carrier phase, and the amount of change in the satellite position are used), a processing load of the Kalman filter may be reduced, and the attitude angle may be calculated with high precision.

Note that, in FIG. 7, the mode where the phase difference calculating part 12, the error estimating part 131A, the integrated processing part 132A, the GNSS speed calculating part 133A, and the GNSS position calculating part 134A are configured to be separated functional parts is illustrated. However, these functional parts may be formed by a single information processing device. Furthermore, the receiving parts 11A, 11B and 11C may also be formed so as to be included in the single information processing device. In this case, the information processing device may store beforehand program(s) which implements the following method of calculating the state, and read and execute the program(s).

Figure 8:
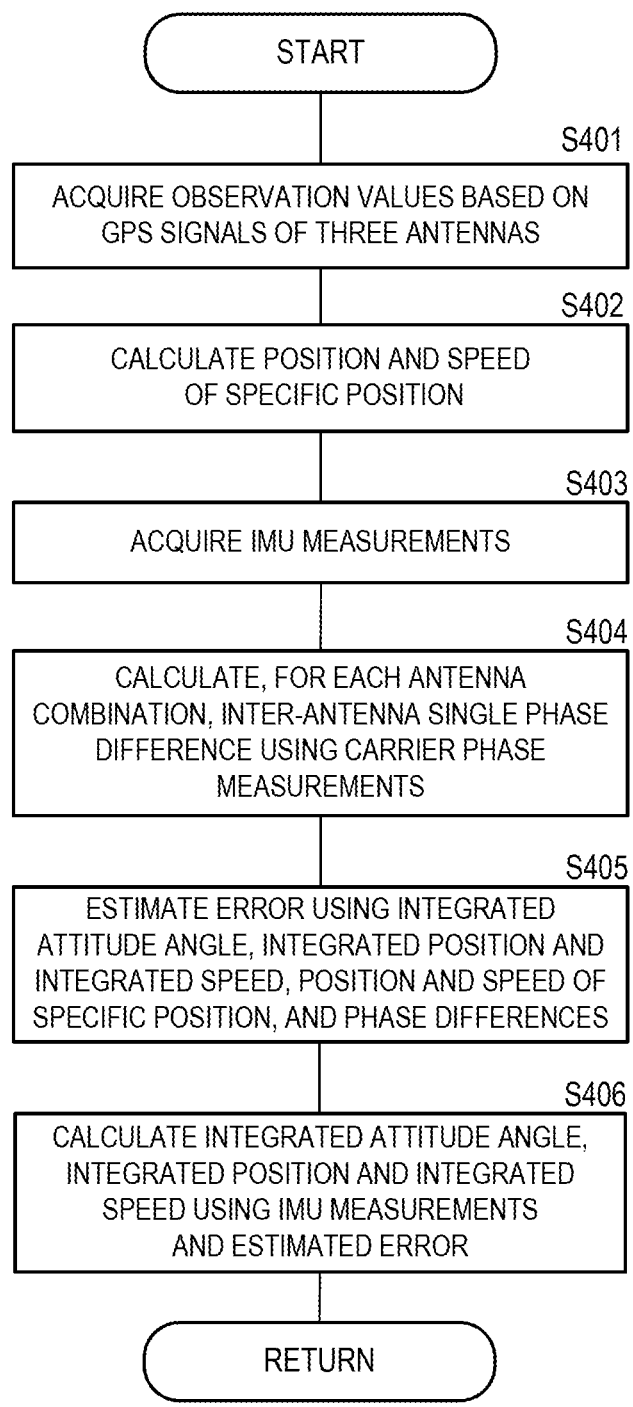
FIG. 8 is a flowchart of a method of calculating a state according to the second embodiment of the present disclosure.

FIG. 8 is a flowchart of the method of calculating the state according to the second embodiment of the present disclosure. Note that, although in this embodiment a case where the single phase difference is used is described, the double phase difference may also be used similar to the first embodiment.

The information processing device may acquire and track the GPS signals received by the first, second, and third antennas 100A, 100B and 100C. The information processing device may calculate the positions $PO_A$, $PO_B$ and $PO_C$, the speeds $PV_A$, $PV_B$ and $PV_C$, and the carrier phase measurements $PY_A$, $PY_B$ and $PY_C$ of the first, second and third antennas 100A, 100B and 100C (S401).

The information processing device may calculate the position $PO_O$ of the specific position using the positions $PO_A$, $PO_B$ and $PO_C$ of the first, second, and third antennas 100A, 100B and 100C, and calculate the speed $PV_O$ of the specific position using the speeds $PV_A$, $PV_B$ and $PV_C$ of the first, second, and third antennas 100A, 100B and 100C (S402).

The information processing device may acquire the acceleration $a_{IMU}$ and the angular velocity $\omega_{IMU}$ from the inertia sensor 20 (S403).

The information processing device may combine the first, second, and third antennas 100A, 100B and 100C by setting the master antenna and the slave antenna, and set the plurality of combinations of antennas. Here, the information processing device may set each antenna both as the slave antenna and as the master antenna. The information processing device may calculate, for each combination of the antennas, the inter-antenna phase differences $\Delta\zeta_{AB}$, $\Delta\zeta_{BC}$ and $\Delta\zeta_{CA}$ which are the inter-antenna single phase differences using the carrier phase measurements $PY_A$, $PY_B$ and $PY_C$ (S404).

The information processing device may estimate the calculation error $\varepsilon_P$ of the position, the calculation error $\varepsilon_V$ of the speed, and the calculation error $\varepsilon_{AT}$ of the attitude angle using the position $PO_O$ of the specific position, the speed $PV_O$, and the inter-antenna phase differences $\Delta\zeta_{AB}$, $\Delta\zeta_{BC}$ and $\Delta\zeta_{CA}$, and the integrated position $P_{UN}$, the integrated speed $V_{UN}$, and the integrated attitude angle $AT_{UN}$ which are obtained from the previous calculation (S405). Here, the information processing device may use a Kalman filter etc. Note that the integrated position $P_{UN}$, the integrated speed $V_{UN}$, and the integrated attitude angle $AT_{UN}$ may suitably be set. Thus, the error estimations of the integrated position $P_{UN}$, the integrated speed $V_{UN}$, and the integrated attitude angle $AT_{UN}$ by the Kalman filter are continued, and the calculations of correcting by the errors are performed. Therefore, the integrated position $P_{UN}$, the integrated speed $V_{UN}$, and the integrated attitude angle $AT_{UN}$ may approach their true values.

The information processing device may calculate the integrated position $P_{UN}$, the integrated speed $V_{UN}$, and the integrated attitude angle $AT_{UN}$ using the acceleration $a_{IMU}$, the angular velocity $\omega_{IMU}$, the calculation error $\varepsilon_P$ of the position, the calculation error $\varepsilon_V$ of the speed, and the calculation error $\varepsilon_{AT}$ of the attitude angle (S406).

Figure 9:
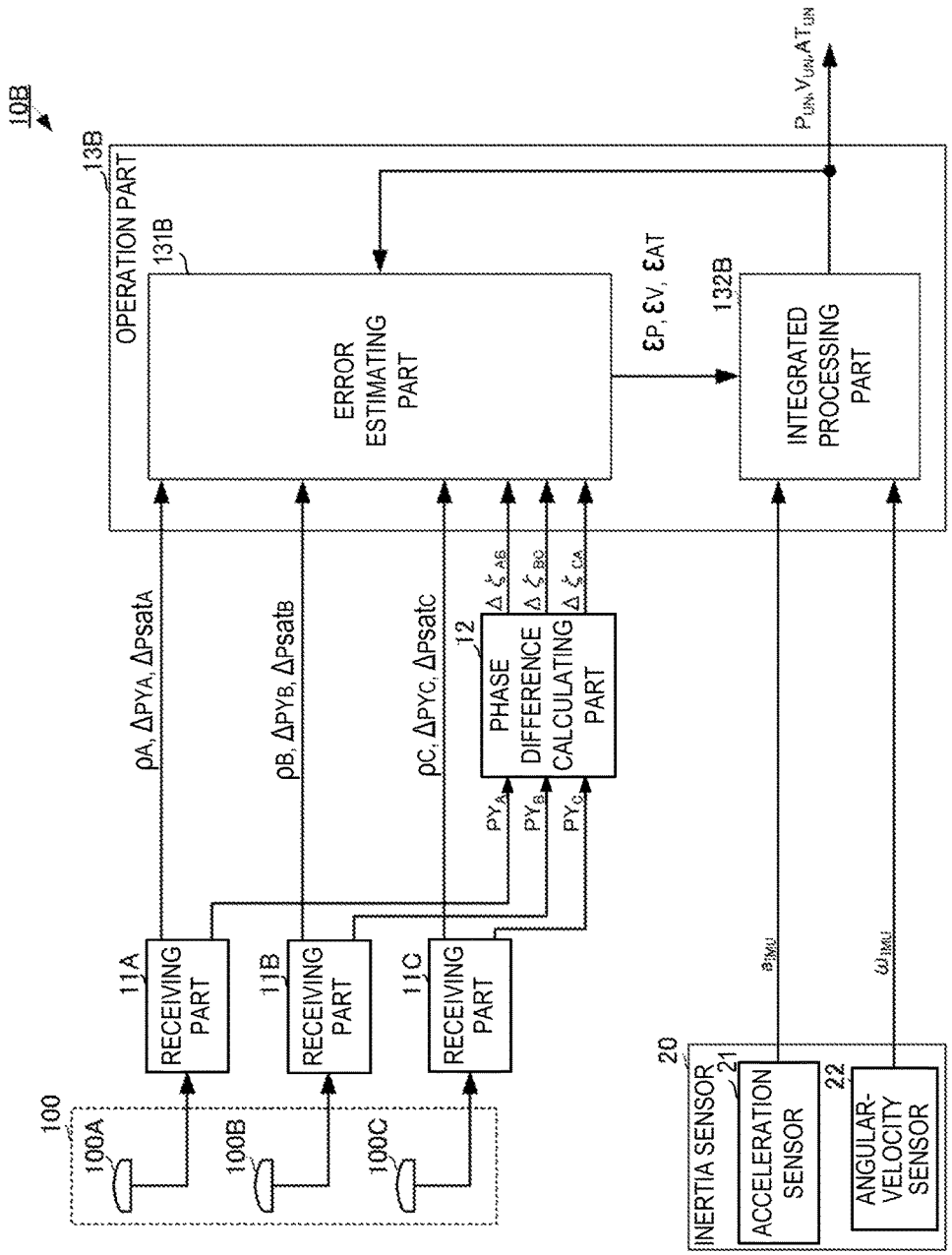
FIG. 9 is a block diagram of a state calculating device according to a third embodiment of the present disclosure.

Next, a state calculating device, a method of calculating a state, and a state calculating program according to a third embodiment are described with reference to the accompanying drawings. FIG. 9 is a block diagram of the state calculating device according to the third embodiment of the present disclosure.

The state calculating device 10B according to this embodiment may differ in the configuration of an operation part 13B from the state calculating device 10A according to the second embodiment. Moreover, processings of the receiving parts 11A, 11B and 11C may differ from those of the state calculating device 10A according to the second embodiment.

The receiving part 11A may acquire a pseudo range $\rho_A$, an amount of change in the carrier phase $\Delta PY_A$, and an amount of change in the satellite position $\Delta Psat_A$, in the tracking processing of the GPS signal. The amount of change in the carrier phase may be an amount of change in the carrier phase at a given time interval. The amount of change in the satellite position may be an amount of change in the satellite position at the given time interval. The amount of change in the satellite position may be obtained by analyzing the navigation message.

The receiving part 11B may acquire a pseudo range $\rho_B$, an amount of change in the carrier phase $\Delta PY_B$, and an amount of change in the satellite position $\Delta Psat_B$, in the tracking processing of the GPS signal.

The receiving part 11C may acquire a pseudo range $\rho_C$, an amount of change in the carrier phase $\Delta PY_C$, and an amount of change in the satellite position $\Delta Psat_C$, in the tracking processing of the GPS signal.

The operation part 13B may include an error estimating part 131B and an integrated processing part 132B.

The error estimating part 131B may accept inputs of the pseudo ranges $\rho_A$, $\rho_B$ and $\rho_C$, the amounts of change in the carrier phase $\Delta PY_A$, $\Delta PY_B$ and $\Delta PY_C$, the amounts of change in the satellite position $\Delta Psat_A$, $\Delta Psat_B$ and $\Delta Psat_C$, and the inter-antenna phase differences $\Delta\zeta_{AB}$, $\Delta\zeta_{BC}$ and $\Delta\zeta_{CA}$. Moreover, the error estimating part 131B may accept inputs of the previous integrated position $P_{UN}$, integrated speed $V_{UN}$, and integrated attitude angle $AT_{UN}$.

The error estimating part 131B may set observation values based on these input values, and set the Kalman filter in which the calculation error $\varepsilon_P$ of the position, the calculation error $\varepsilon_V$ of the speed, and the calculation error $\varepsilon AT$ of the attitude angle are set as the estimated values. The error estimating part 131B may estimate, by carrying out the calculation processing of this Kalman filter, the calculation error $\varepsilon_P$ of the position, the calculation error $\varepsilon_V$ of the speed, and the calculation error $\varepsilon_{AT}$ of the attitude angle, and output them to the integrated processing part 132B.

The integrated processing part 132B may calculate the integrated position $P_{UN}$, the integrated speed $V_{UN}$, and the integrated attitude angle $AT_{UN}$ using the acceleration $a_{IMU}$ and the angular velocity $\omega_{IMU}$. Here, the integrated processing part 132B may perform the correction by the calculation error $\varepsilon_P$ of the position, the calculation error $\varepsilon_V$ of the speed, and the calculation error $\varepsilon_{AT}$ of the attitude angle.

Even if such a configuration is used, the attitude angle may be calculated with high precision similar to the second embodiment. Furthermore, in the configuration of this embodiment, the position and the speed may also be calculated with high precision.

Note that, in FIG. 9, the mode in which the phase difference calculating part 12, the error estimating part 131B, and the integrated processing part 132B may be separate functional parts is illustrated. However, these functional parts may be formed by a single information processing device. Furthermore, the receiving parts 11A, 11B and 11C may be formed so as to be included in the single information processing device. In this case, the information processing device may store beforehand program(s) which implement the following method of calculating the state, and read and execute the program(s).

Figure 10:
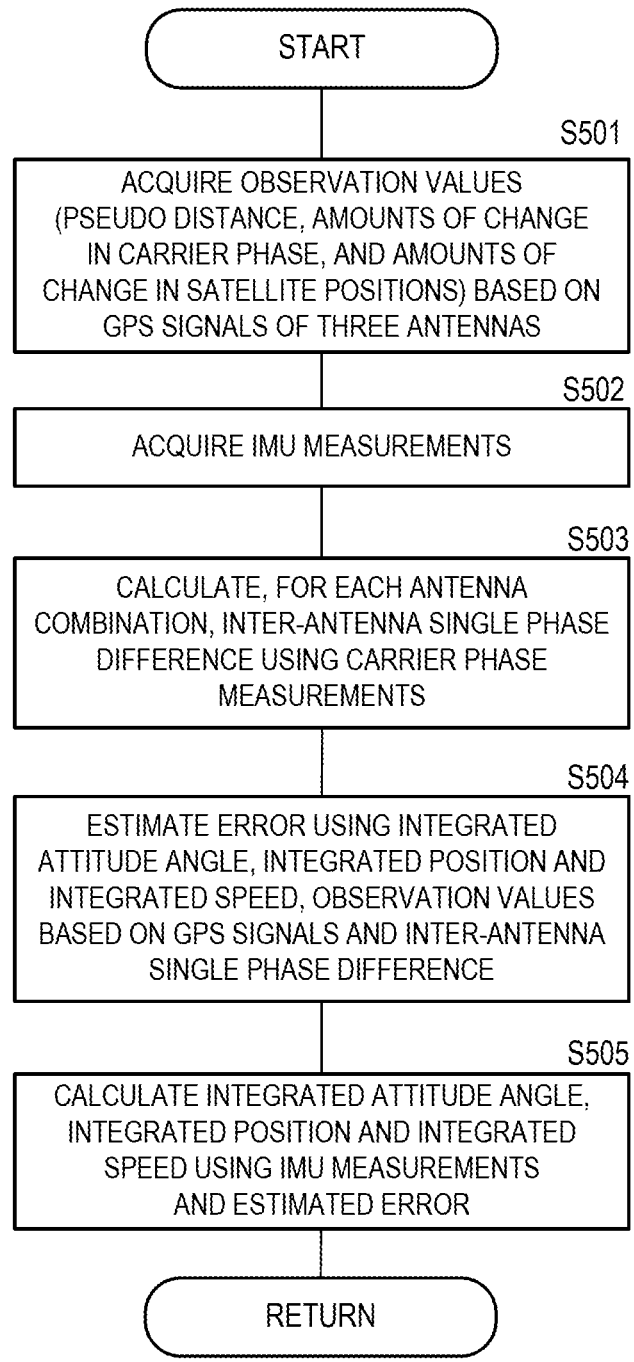
FIG. 10 is a flowchart of a method of calculating a state according to the third embodiment of the present disclosure.

FIG. 10 is a flowchart of the method of calculating the state according to the third embodiment of the present disclosure. Although the method of calculating the state according to this embodiment may differ in the observation values of the Kalman filter and in the setting of the Kalman filter according to the changes of the observation values, fundamental processing may be the same as that of the method of calculating the state according to the second embodiment. Note that, although in this embodiment a case where the single phase difference is used may be described, the double phase difference may also be used similar to the first and second embodiments.

The information processing device may acquire and track the GPS signals received by the first, second, and third antennas 100A, 100B and 100C. The information processing device may calculate the pseudo ranges $\rho_A$, $\rho_B$ and $\rho_C$, the carrier phase measurements $PY_A$, $PY_B$ and $PY_C$, the amounts of change in the carrier phase $\Delta PY_A$, $\Delta PY_B$ and $\Delta PY_C$, and the amounts of change in the satellite position $\Delta Psat_A$, $\Delta Psat_B$ and $\Delta Psat_C$ (S501).

The information processing device may acquire the acceleration $a_{IMU}$ and the angular velocity $\omega_{IMU}$ from the inertia sensor 20 (S502).

The information processing device may combine the first, second, and third antennas 100A, 100B and 100C by setting the master antenna and the slave antenna, and set the plurality of combinations of antennas. Here, the information processing device may set each antenna both as the slave antenna and as the master antenna. The information processing device may calculate the inter-antenna phase differences $\Delta\zeta_{AB}$, $\Delta\zeta_{BC}$ and $\Delta\zeta_{CA}$ which are the inter-antenna single phase differences for each combination of the antennas using the carrier phase measurements $PY_A$, $PY_B$ and $PY_C$ (S503).

The information processing device may estimate the calculation error $\varepsilon_P$ of the position, the calculation error $\varepsilon_V$ of the speed, and the calculation error $\varepsilon_{AT}$ of the attitude angle using the pseudo ranges $\rho_A$, $\rho_B$ and $\rho_C$, the amounts of change in the carrier phase $\Delta PY_A$, $\Delta PY_B$ and $\Delta PY_C$, the amounts of change in the satellite position $\Delta Psat_A$, $\Delta Psat_B$ and $\Delta Psat_C$, the inter-antenna phase differences $\Delta\zeta_{AB}$, $\Delta\zeta_{BC}$ and $\Delta\zeta_{CA}$ and the integrated position $P_{UN}$, the integrated speed $V_{UN}$, and the integrated attitude angle $AT_{UN}$ which are obtained from the previous calculation (S504). Here, the information processing device may use a Kalman filter etc.

The information processing device may calculate the integrated position $P_{UN}$, the integrated speed $V_{UN}$, and the integrated attitude angle $AT_{UN}$ using the acceleration $a_{IMU}$, the angular velocity $\omega_{IMU}$, the calculation error $\varepsilon_P$ of the position, the calculation error $\varepsilon_V$ of the speed, and the calculation error $\varepsilon_{AT}$ of the attitude angle (S505).

Figure 11:
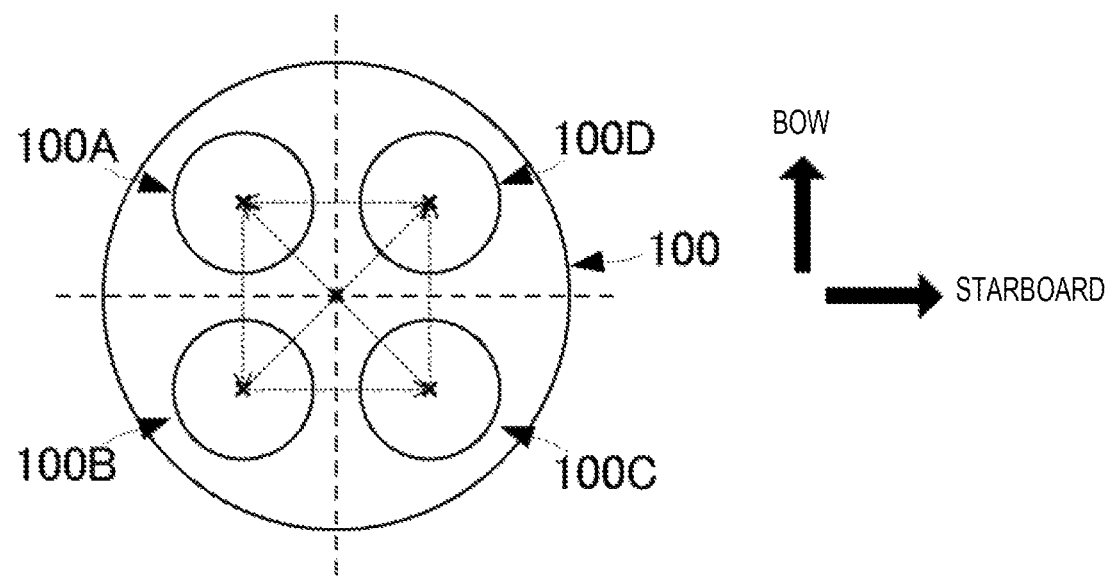
FIG. 11 is a view illustrating a spatial relationship of antennas in a case where the number of antennas is four.

Note that, although in the above description the mode where three antennas may be used is illustrated, four or more antennas may also be used. FIG. 11 is a view illustrating a spatial relationship of the antennas in a case where the number of antennas is four.

The antenna part 100 may include the first antenna 100A, the second antenna 100B, the third antenna 100C, and a fourth antenna 100D.

As illustrated in FIG. 11, the first antenna 100A and the second antenna 100B may be disposed so that a base line connecting these antennas is parallel to directions connecting a bow and a stern (bow-stern directions). The third antenna 100C and the fourth antenna 100D are disposed so that a base line connecting these antennas is parallel to the bow-stern directions.

The first antenna 100A and the fourth antenna 100D may be disposed so that a base line connecting these antennas is parallel to directions connecting a starboard and a port (directions perpendicular to the bow-stern directions). The second antenna 100B and the third antenna 100C may be disposed so that a base line connecting these antennas is parallel to the directions perpendicular to the bow-stern directions.

In this configuration, one of the first antenna 100A, the second antenna 100B, the third antenna 100C, and the fourth antenna 100D may correspond to the first GNSS antenna of the present disclosure, and other two antennas may correspond to the second GNSS antenna and the third GNSS antenna of the present disclosure.

Even if this configuration is used, the operations and effects illustrated in each embodiment may be acquired.

Note that, the antenna may desirably be arranged so that the base line connecting two of three or more antennas may be parallel to the bow-stern directions. By using such an arrangement, the calculation of the yaw angle $\psi$ may become further easier.

The invention claimed is:

1. A state calculating device, comprising:
   a first GNSS antenna, a second GNSS antenna, and a third GNSS antenna are fixedly arranged in the state calculating device, the first GNSS antenna, the second GNSS antenna, and the third GNSS antenna configured to receive GNSS signals, respectively;
   a first GNSS receiver configured to calculate a carrier phase of the GNSS signal received by the first GNSS antenna;
   a second GNSS receiver configured to calculate a carrier phase of the GNSS signal received by the second GNSS antenna;
   a third GNSS receiver configured to calculate a carrier phase of the GNSS signal received by the third GNSS antenna; and
   processing circuitry configured
   to select two of the first GNSS antenna, the second GNSS antenna, and the third GNSS antenna,
   to determine three or more combinations of a master antenna and a slave antenna in the state calculating device, and
   to calculate an inter-antenna phase difference, for every combination, using the carrier phases of the GNSS antennas used for the combination; and
   to calculate an attitude angle using the inter-antenna phase differences calculated for every combination, wherein
   at least one master antenna for the combination of a master antenna and a slave antenna differs from the master antenna for the other combinations.

2. The state calculating device of claim 1, wherein the processing circuitry is further configured to calculate geometric distance differences between the antennas from the plurality of inter-antenna phase differences, and calculates the attitude angle from the geometric distance differences.

3. The state calculating device of claim 2, wherein,
   processing circuitry is further configured
   to estimate a calculation error of the attitude angle using the geometric distance differences and a geometric distance difference based on an attitude angle of the past calculated by the integrated processing part, and
   to calculate the attitude angle using an angular velocity or an acceleration measured by an inertia sensor, and the calculation error of the attitude angle.

4. The state calculating device of claim 3, wherein,
   the processing circuitry is further configured to estimate, using positions calculated from the GNSS signals received by the plurality of GNSS antennas, and positions of the past calculated by the processing circuitry, calculation errors of the positions,
   to estimate, using speeds calculated from the GNSS signals received by the plurality of GNSS antennas, and speeds of the past calculated by the integrated processing part, calculation errors of the speeds,
   to output the calculation errors of the positions and the calculation errors of the speeds to the integrated processing part, and
   to calculate a position and a speed using the angular velocity and the acceleration measured by the inertia sensor, and the calculation errors of the positions and the calculation errors of the speeds.

5. The state calculating device of claim 4, wherein the processing circuitry is further configured:
to calculate a position of a specific point using the position of the first GNSS antenna calculated by the first GNSS receiver, the position of the second GNSS antenna calculated by the second GNSS receiver, and the position of the third GNSS antenna calculated by the third GNSS receiver;
to calculate a speed of the specific point using the speed of the first GNSS antenna calculated by the first GNSS receiver, the speed of the second GNSS antenna calculated by the second GNSS receiver, and the speed of the third GNSS antenna calculated by the third GNSS receiver; and
to estimate the calculation errors of the positions using the position of the specific point and the position of the past of the specific point calculated by the integrated processing part, or the calculation errors of the speeds using the speed of the specific point and the speed of the past of the specific point calculated by the integrated processing part.

6. The state calculating device of claim 5, wherein the attitude angle is a yaw angle.

7. The state calculating device of claim 4, wherein the attitude angle is a yaw angle.

8. The state calculating device of claim 3, wherein the attitude angle is a yaw angle.

9. The state calculating device of claim 2, wherein the attitude angle is a yaw angle.

10. The state calculating device of claim 1, wherein the attitude angle is a yaw angle.

11. A method of calculating a state, comprising:
calculating a carrier phase of a GNSS signal received by a first GNSS antenna;
calculating a carrier phase of a GNSS signal received by a second GNSS antenna;
calculating a carrier phase of a GNSS signal received by a third GNSS antenna;
selecting two of the first GNSS antenna, the second GNSS antenna, and the third GNSS antenna fixedly arranged, respectively, in a state calculating device, determining three or more combinations of a master antenna and a slave antenna in the state calculating device and calculating an inter-antenna phase difference, for every combination, using the carrier phases of the GNSS antennas used for the combination; and calculating an attitude angle using the plurality of inter-antenna phase differences calculated for every combination, wherein at least one master antenna for the combination of a master antenna and a slave antenna differs from the master antenna for the other combinations.

12. The method of claim 11, wherein the calculating the attitude angle includes calculating geometric distance differences between the antennas from the plurality of inter-antenna phase differences, and calculating the attitude angle from the geometric distance differences.

13. The method of claim 12, wherein,
the calculating the attitude angle includes calculating an error and integrating,
the estimating the error includes estimating a calculation error of the attitude angle using the geometric distance differences and a geometric distance difference based on an attitude angle of the past calculated by the integrating, and
the integrating includes calculating the attitude angle using an angular velocity or an acceleration measured by the inertia sensor, and the calculation error of the attitude angle.

14. The method of claim 13, wherein,
positions and speeds are calculated in addition to the attitude angle,
the estimating the error includes estimating, using positions calculated from the GNSS signals received by the plurality of GNSS antennas, and positions of the past calculated by the integrating, calculation errors of the positions,
the estimating the error includes estimating, using speeds calculated from the GNSS signals received by the plurality of GNSS antennas, and speeds of the past calculated by the integrating, calculation errors of the speeds,
the estimating the error includes outputting the calculation errors of the positions and the calculation errors of the speeds to the integrating, and
the integrating includes calculating a position and a speed using the angular velocity and the acceleration measured by the inertia sensor, the calculation errors of the positions and the calculation errors of the speeds.

15. The method of claim 14, further comprising:
calculating a position of a specific point using the position of the first GNSS antenna, the position of the second GNSS antenna, and the position of the third GNSS antenna; and
calculating a speed of a specific point using the speed of the first GNSS antenna, the speed of the second GNSS antenna, and the speed of the third GNSS antenna,
wherein the calculating the attitude angle, the position, and the speed includes estimating the calculation errors of the positions using the position of the specific point and the position of the past of the specific point calculated by the integrating, or the calculation errors of the speeds using the speed of the specific point and the speed of the past of the specific point.

16. A state calculating program, configured to cause an information processing device to execute processing to receive GNSS signals and calculate an attitude angle of a movable body, the processing comprising:
calculating a carrier phase of a GNSS signal received by a first GNSS antenna;
calculating a carrier phase of a GNSS signal received by a second GNSS antenna;
calculating a carrier phase of a GNSS signal received by a third GNSS antenna;
selecting two of the first GNSS antenna, the second GNSS antenna, and the third GNSS antenna fixedly arranged, respectively, in a state calculating device, determining three or more combinations in the state calculating device of a master antenna and a slave antenna of which at least one master antenna differs, and calculating an inter-antenna phase difference, for every combination, using the carrier phases of the GNSS antennas used for the combination; and
calculating an attitude angle using the plurality of inter-antenna phase differences calculated for every combination.

17. The state calculating program of claim 16, wherein the calculating the attitude angle includes calculating geometric distance differences between the antennas from the plurality of inter-antenna phase differences, and calculating the attitude angle from the geometric distance difference.

18. The state calculating program of claim 17, wherein,
the calculating the attitude angle includes calculating an error and integrating,
the estimating the error includes estimating a calculation error of the attitude angle using the geometric distance difference and a geometric distance difference based on an attitude angle of the past calculated by the integrating, and
the integrating includes calculating the attitude angle using an angular velocity or an acceleration measured by the inertia sensor, and the calculation error of the attitude angle.

19. The state calculating program of claim 18, wherein,
positions and speeds are calculated in addition to the attitude angle,
the estimating the error includes estimating, using positions calculated from the GNSS signals received by the plurality of GNSS antennas, and positions of the past calculated by the integrating, calculation errors of the positions,
the estimating the error includes estimating, using speeds calculated from the GNSS signals received by the plurality of GNSS antennas, and speeds of the past calculated by the integrating, calculation errors of the speeds,
and
the integrating includes calculating a position and a speed using the angular velocity and the acceleration measured by the inertia sensor, the calculation errors of the positions and the calculation errors of the speed.

20. The state calculating program of claim 19, further comprising:
calculating a position of a specific point using the position of the first GNSS antenna, the position of the second GNSS antenna, and the position of the third GNSS antenna,
calculating a speed of a specific point using the speed of the first GNSS antenna, the speed of the second GNSS antenna, and the speed of the third GNSS antenna
wherein the calculating the attitude angle, the position, and the speed includes estimating the calculation errors of the positions using the position of the specific point and the position of the past of the specific point calculated by the integrating, or the calculation errors of the speeds using the speed of the specific point and the speed of the past of the specific point.

* * * * *